United States Patent [19]
Higgins, Jr.

[11] Patent Number: 5,274,454
[45] Date of Patent: Dec. 28, 1993

[54] PROGRAMMING INTERFACE FOR ELECTRONIC DEVICES

[75] Inventor: Robert J. Higgins, Jr., Plantation, Fla.

[73] Assignee: Motorola, Inc., Schaumburg, Ill.

[21] Appl. No.: 927,048

[22] Filed: Aug. 10, 1992

[51] Int. Cl.⁵ .............................................. H04N 5/40
[52] U.S. Cl. ................................... 358/186; 358/194.1; 358/141; 359/146; 340/825.44; 340/825.72; 455/89
[58] Field of Search .................. 455/95, 74, 89, 186.2; 359/142, 146; 340/825.71, 825.72, 825.44; 358/186, 141, 188, 189, 194.1

[56] References Cited

U.S. PATENT DOCUMENTS

| | | | |
|---|---|---|---|
| 4,696,054 | 9/1987 | Tsugei et al. | 455/89 |
| 4,748,501 | 5/1988 | Long | 358/194.1 |
| 4,786,902 | 11/1988 | Davis et al. | 340/825.44 |
| 5,127,021 | 6/1992 | Schreiber | 358/186 |
| 5,138,312 | 8/1992 | Tsukamoto et al. | 340/825.44 |

OTHER PUBLICATIONS

Motorola, Systems Saber FM Portable Radio for Securenet Smartnet II Systems, pp. 1-8, Apr. 1990.

Primary Examiner—James J. Groody
Assistant Examiner—Jeffrey S. Murrell
Attorney, Agent, or Firm—Pedro P. Hernandez

[57] ABSTRACT

A programmable electronic product includes a video generator (120) and RF modulator (122) for interfacing with an external video monitor. The programmable electronic product can then be programmed by the product user with the programming information being displayed on the external video monitor.

10 Claims, 1 Drawing Sheet

PROGRAMMING INTERFACE FOR ELECTRONIC DEVICES

TECHNICAL FIELD

This invention relates generally to electronic devices and more specifically to programmable electronic devices.

BACKGROUND

As microprocessor technology continues to be applied to personal electronic products (e.g., two-way radios, pagers, pocket organizers, etc.), the trend in the field has been to provide a greater number of user selectable options. With the improvements in technology has also come a reduction in the size of many electronic devices. This reduction in size has lead to the decrease in the number and size of user controls (e.g., smaller display areas, etc.) found on electronic devices such as two-way radios, pagers, etc. The reduced number and size of controls now available to a user, coupled to the increase in user programmable features, has caused a reduction in user feedback when the user wants to reconfigure his device.

In the specific case of communication devices such as two-way radios, there may sometimes not even be a device display available to provide direct user feedback. Historically, the way to solve this problem has been to connect the radio to a computer system having a special radio interface and then programming the radio using the computer system. However, this option is not always available to a radio user (e.g., the user does not have access to a computer, etc.).

A good example of the present art with regards to user programming of a two-way radio, is the field programmer used to program a Motorola, Inc. SABER TM radio. The SABER TM field programmer includes a personal computer which runs a special radio programming software package for programming user programmable features found in the radio. When programming the radio, the radio is first coupled to the computer via a set of special cables and a radio interface box (mostly used for voltage level shifting). When the programming software is executed on the computer, a set of menus appear for the radio user to select the desired options in order to customize his radio.

The video display in the computer system provides an effective way to interface with the user in order to provide a complete set of menus which inform the user of what user selectable options he can modify in his radio (e.g., frequencies, time-out-timer delays, power level, etc.). Once the user selects his options, the computer reprograms the radio by transmitting the selected information to the radio.

In another technology area, video cassette recorders (VCRs) that have on-screen (television screen) programming provide for a user to program the VCR using the television that is connected to the VCR. Most programmable VCR are however typically set-up were they are coupled via a cable and the user programs the unit using an infrared remote control device.

In the future, as radios and other portable devices become more and more capable of providing different features, it is reasonable to expect that a greater degree of user selectable options will be available for users to chose from in order to customize their electronic products.

A need thus exists for providing an electronic device having a built-in programming interface that will provide for a device user to customize his product. The programming interface allowing for the interaction with external video devices such as, television sets, video monitors, etc.

DETAILED DESCRIPTION OF THE PREFERRED EMBODIMENT

Figure 1:
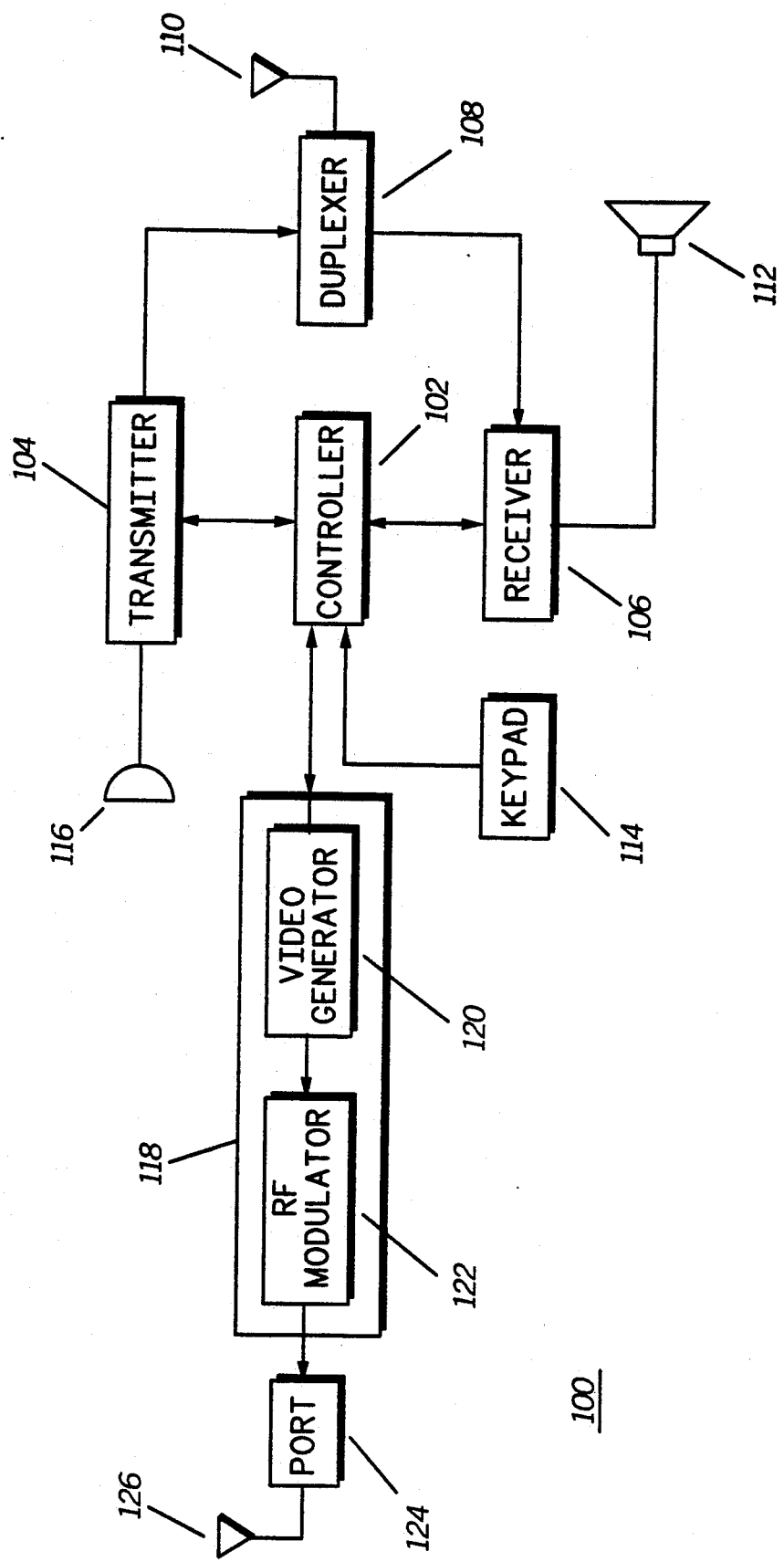
FIG. 1 is a block diagram of a two-way radio in accordance with the present invention.

In FIG. 1, a block diagram of a portable electronic device such as a two-way radio 100 is shown. Radio 100 includes conventional transmitter 104 and receiver 106 sections. Both the transmitter 104 and receiver 106 are coupled to a control means such as a microprocessor or microcontroller 102. Controller 102 can be any of a number of commercially available microcontrollers. Preferably, controller 102 includes on-board memory and input/output capabilities. Coupled to transmitter 104, is microphone 116, for receiving voice information and applying them to transmitter 104 for subsequent transmission. Coupled to receiver 106 is a speaker 112 for presentation of audio information. A keypad or set of user controls 114 is coupled to controller 102, for providing radio controls to the radio user. Keypad 114 can include one or more keys. Transmitter 104 and receiver 106 are selectively coupled to antenna 110 via duplexer 108 in order to transmit and receive information.

The present invention comprises adding a video interface means 118 to radio 100. In the preferred embodiment, video interface means 118 comprises a video generator 120 which preferably converts programming information generated by radio controller 102 into information which can be displayed on a conventional television or other video monitor device. The video format that the video generator employs will depend on the formatting standard being utilized by the external video device (e.g., NTSC, PAL, etc.). Video generator 120 could also be designed to support more than one video formatting standard with the device user being able to select from among the available standards.

A radio frequency modulator 122 such as a low power television band transmitter, is coupled to video generator 120, and is utilized to transfer the video information from the video generator output terminal to the external television via radio frequency. Modulator 122 can preferably be an ultra-high frequency (UHF) modulator operating in the frequency band of standard television sets.

Controller 102 receives information from keypad 114 (which can consist of at least one user control key), to transmit information to video generation means 118. In practice, on any nearby television, a television channel would be selected (perhaps a particular channel in the UHF band) and the user would transmit the modulated user interface information to the television. The user programming information would then appear in the television screen for modification by the user.

In operation, the electronic device user would enter a "set-up" mode via keypad 114, which would turn on video interface means 118 in radio 100. The user would then tune the television to the appropriate channel and follow the instructions ("menus") as he would if he were using the prior art radio computer programming device. The menu selectors would be controls found in the radio such as keypad 114. At a minimum, all that would be required would be at least one user control (key) to interact with the programming menu which is displayed in the external television display. More user controls (keys) would make the radio programming simpler and easier to select programmable radio options. The keys on keypad 114 would in effect become a set of context sensitive function key selections that the user would use depending on the menu on the external television.

Preferably, the modulated information sent by RF modulator 122 is transmitted via antenna 126 found in radio 100. Antenna 126 can be an internal antenna or it could be a removable external antenna which is attached to radio 100 when radio programming is required. Antenna 126 can be an antenna which is internal to radio 100. The RF output of RF modulator 122 could also be designed to use radio antenna 110 by using appropriate antenna switching techniques known in the art. For example, an antenna switch (not shown) could be added between the output of RF modulator 122 and antenna 110. The antenna switch could then be controlled by controller 102 which would couple the output of RF modulator 122 to antenna 110 whenever radio 100 enters the radio programming mode.

Radio 100 can also include an interface port 124 between antenna 126 and the output of modulator 122, which can be used to disable the built-in antenna 126 (either by allowing the antenna to be removed or allowing for antenna 126 to become electrically isolated from the output port of modulator 122). Interface port 124 would allow for radio 100 to be directly coupled via a cable to a television set or other external video device. Video port 124 is useful for external video devices which require direct connection (e.g., have no radio frequency receiver capability) such as computer monitors, etc.

Controller 102 in the present invention would include all of the required user programming software. The programming software would preferably be stored in the controller's memory. The programming software would provide all of the user programmable information to the video interface means 118.

Preferably, when the programming software is selected by the radio user, a set of menus would appear in the external television set, the menus would prompt the user as to what features are allowed to be modified, etc. The user would then move through the menus by way of keypad 114.

In summary, the present invention provides for a simple and cost effective way of allowing for an electronic device user to have programming capabilities even if the device does not include a display. As technology keeps increasing the sophistication of electronic devices, it is expected that more and more electronic devices will provide for more user customization capabilities than are presently available. The present invention provides for a simple and cost effective way of providing user programming capability to programmable devices such as two-way radios and pagers.

What is claimed is:

1. A communication device, comprising:
   a user control;
   a controller responsive to the user control for providing programming information;
   a radio frequency receiver coupled to the controller for receiving radio frequency signals; and
   a video interface means coupled to the controller, comprising:
      a video generator for receiving the programming information from the controller and formatting the received information into video formatted data; and
      a radio frequency modulator for transmitting the video formatted data.

2. A communication device as defined in claim 1, wherein the radio frequency modulator operates in the ultra-high frequency (UHF) band.

3. A communication device as defined in claim 1, wherein the radio frequency modulator operates in the very-high frequency (VHF) band.

4. A communication device as defined in claim 1, wherein the video interface means further comprises an antenna coupled to the radio frequency modulator.

5. A communication device as defined in claim 4, wherein the video interface means further comprises an interface port coupled to the radio frequency modulator.

6. A radio, comprising:
   a user control;
   a controller responsive to the user control for providing programming information;
   a radio frequency receiver and radio frequency transmitter coupled to the controller for receiving and transmitting radio frequency signals;
   a video interface means coupled to the controller, comprising:
      a video generator for receiving the programming information from the controller and formatting the received information into video formatted data; and
      a radio frequency modulator coupled to the video generator for transmitting the video formatted data.

7. A radio as defined in claim 6, wherein the video interface means further comprises an antenna coupled to the radio frequency modulator.

8. A radio as defined in claim 6, wherein the video interface means further comprises an interface port coupled to the radio frequency modulator.

9. A radio as defined in claim 6, wherein the radio frequency modulator operates in the ultra-high frequency (UHF) band.

10. A radio as defined in claim 6, wherein the radio frequency modulator operates in the very-high frequency (VHF) band.

* * * * *